US008197340B2

(12) United States Patent
Garvey et al.

(10) Patent No.: US 8,197,340 B2
(45) Date of Patent: Jun. 12, 2012

(54) WAGERING GAME MACHINE WITH REMOTE AUDIO CONFIGURATION

(75) Inventors: Jesse Garvey, Chicago, IL (US); Steven J. Lee, Naperville, IL (US); Eric M. Pryzby, Skokie, IL (US)

(73) Assignee: WMS Gaming Inc., Waukegan, IL (US)

( * ) Notice: Subject to any disclaimer, the term of this patent is extended or adjusted under 35 U.S.C. 154(b) by 525 days.

(21) Appl. No.: 12/446,928

(22) PCT Filed: Nov. 6, 2007

(86) PCT No.: PCT/US2007/023375

§ 371 (c)(1), (2), (4) Date: Apr. 23, 2009

(87) PCT Pub. No.: WO2008/057538

PCT Pub. Date: May 15, 2008

(65) Prior Publication Data

US 2010/0029385 A1 Feb. 4, 2010

Related U.S. Application Data

(60) Provisional application No. 60/864,486, filed on Nov. 6, 2006.

(51) Int. Cl.
*A63F 13/02* (2006.01)
*A63F 9/24* (2006.01)

(52) U.S. Cl. ........................................... 463/35; 463/42

(58) Field of Classification Search .................... 463/30, 463/34, 35, 42

See application file for complete search history.

(56) References Cited

U.S. PATENT DOCUMENTS

| | | | | |
|---|---|---|---|---|
| 5,192,999 | A * | 3/1993 | Graczyk et al. | 348/552 |
| 6,347,133 | B1 * | 2/2002 | Galbreath | 379/67.1 |
| 7,479,063 | B2 * | 1/2009 | Pryzby et al. | 463/35 |
| 2003/0100359 | A1 | 5/2003 | Loose et al. | |
| 2004/0142739 | A1 | 7/2004 | Loose et al. | |
| 2004/0142747 | A1 | 7/2004 | Pryzby | |
| 2004/0142748 | A1 | 7/2004 | Loose et al. | |
| 2004/0161115 | A1 | 8/2004 | Loose | |

(Continued)

FOREIGN PATENT DOCUMENTS

WO WO-02078388 A2 10/2002

(Continued)

OTHER PUBLICATIONS

"International Application Serial No. PCT/US2007/023375, International Search Report mailed May 9, 2008", 4 pgs.

(Continued)

*Primary Examiner* — Evan Pert

(74) *Attorney, Agent, or Firm* — Schwegman, Lundberg & Woessner, P.A.

(57) ABSTRACT

A computerized wagering game system includes a gaming module comprising gaming code which is operable when executed on to conduct a wagering game on which monetary value can be wagered. The system is coupled to at least one external sign assembly via a sign server, the external sign comprising one or more speakers. The wagering game system provides a volume control interface operable to allow a user of the wagering game system to control the volume of the one or more speakers comprising a part of the external sign assembly via the sign server.

24 Claims, 4 Drawing Sheets

U.S. PATENT DOCUMENTS

| | | | | |
|---|---|---|---|---|
| 2005/0043090 | A1 | 2/2005 | Pryzby et al. | |
| 2005/0054440 | A1 | 3/2005 | Anderson et al. | |
| 2005/0054442 | A1 | 3/2005 | Anderson et al. | |
| 2005/0277469 | A1 | 12/2005 | Pryzby et al. | |
| 2005/0282631 | A1 | 12/2005 | Bonney et al. | |
| 2006/0009285 | A1 | 1/2006 | Pryzby et al. | |
| 2006/0068909 | A1 | 3/2006 | Pryzby et al. | |
| 2006/0073881 | A1 | 4/2006 | Pryzby et al. | |
| 2006/0100015 | A1 | 5/2006 | Loose et al. | |
| 2006/0153405 | A1 * | 7/2006 | Myers | 381/107 |
| 2006/0199645 | A1 * | 9/2006 | Canterbury et al. | 463/43 |

FOREIGN PATENT DOCUMENTS

| | | | |
|---|---|---|---|
| WO | WO-02078388 | A3 | 10/2002 |
| WO | WO-2004075601 | A1 | 9/2004 |
| WO | WO-2005117647 | A1 | 2/2005 |
| WO | WO-2005086526 | A1 | 9/2005 |
| WO | WO-2005113089 | A1 | 12/2005 |
| WO | WO-2005113091 | A1 | 12/2005 |
| WO | WO-2005114598 | A1 | 12/2005 |
| WO | WO-2006017444 | A2 | 2/2006 |
| WO | WO-2006017444 | A3 | 2/2006 |
| WO | WO-2006017445 | A2 | 2/2006 |
| WO | WO-2006017445 | A3 | 2/2006 |
| WO | WO-2006039284 | A2 | 4/2006 |
| WO | WO-2006039323 | A1 | 4/2006 |

OTHER PUBLICATIONS

"International Application Serial No. PCT/US2007023375, International Written Opinion mailed May 9, 2008", 7 pgs.

* cited by examiner

WAGERING GAME MACHINE WITH REMOTE AUDIO CONFIGURATION

RELATED APPLICATIONS

This patent application is a U.S. National Stage Filing under 35 U.S.C. 371 from International Patent Application Serial No. PCT/US2007/023375, filed Nov. 6, 2007, and published on May 15, 2008, as WO 2008/057538 A2 and republished as WO 2008/057538 A3, which claims the priority benefit of U.S. Provisional Patent Application Ser. No. 60/864,486 filed Nov. 6, 2006 and entitled "REMOTE CONFIGURATION OF PERIPHERAL AUDIO IN A WAGERING GAME MACHINE", the contents of which are incorporated herein by reference in their entirety.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent records, but otherwise reserves all copyright rights whatsoever. Copyright 2006, 2007, WMS Gaming, Inc.

FIELD OF THE INVENTION

The invention relates generally to audio in a wagering game machine environment, and more specifically to control of peripheral audio in a wagering game machine.

BACKGROUND

Computerized wagering games have largely replaced traditional mechanical wagering game machines such as slot machines, and are rapidly being adopted to implement computerized versions of games that are traditionally played live such as poker and blackjack. These computerized games provide many benefits to the game owner and to the game player, including greater reliability than can be achieved with a mechanical game or human dealer, more variety, sound, and animation in presentation of a game, and a lower overall cost of production and management.

The elements of computerized wagering game systems are in many ways the same as the elements in the mechanical and table game counterparts in that they must be fair, they must provide sufficient feedback to the game player to make the game fun to play, and they must meet a variety of gaming regulations to ensure that both the machine owner and gamer are honest and fairly treated in implementing the game. Further, they must provide a gaming experience that is at least as attractive as the older mechanical gaming machine experience to the gamer, to ensure success in a competitive gaming market.

Computerized wagering games do not rely on the dealer or other game players to facilitate game play and to provide an entertaining game playing environment, but rely upon the presentation of the game and environment generated by the wagering game machine itself. Incorporation of audio and video features into wagering games to present the wagering game, to provide help, and to enhance the environment presented are therefore important elements in the attractiveness and commercial success of a computerized wagering game system. It is not uncommon for audio voices to provide instruction and help, and to provide commentary on the wagering game being played. A variety of complex graphics and video capabilities are also often provided via one or more specialized graphics processors, including the ability to decode and render full motion video, and to render complex three-dimensional graphics.

In some embodiments, sound and graphics are also displayed on a sign or display area common to two or more wagering game machines, such as where a progressive slot machine pool of games are coordinated via a progressive slot controller or server, and information such as the progressive jackpot value and sounds such as jackpot sounds are presented via the common sign or display peripheral device. In a more sophisticated example, a number of wagering game machines sharing a common theme, such as a Monopoly™ or Powerball™-themed game, are coupled to a community game server that coordinates participation in a community game, such as accumulation of lottery numbers or progression around a Monopoly™ board and awarding of bonuses.

The common sign or display comprises in some embodiments a special-purpose sign, while in other embodiments comprises a display such as a large plasma display that is configured to display information to several game players at the same time. In some embodiments, the common sign or display also includes sound, such as to indicate progression in the common or community game, to provide instruction or status information, or to indicate jackpots or other awards. But, configuration and control of audio features of the sign are typically done by processes such as climbing a ladder to reach the sign and manually adjusting a potentiometer, or by other such labor-intensive processes. For these and other reasons, more efficient management of audio characteristics of peripheral sign displays is desired.

SUMMARY

One example embodiment of the invention comprises a computerized wagering game system including a gaming module comprising gaming code which is operable when executed on to conduct a wagering game on which monetary value can be wagered. The wagering game system is coupled to at least one external sign assembly via a sign server, the external sign comprising one or more speakers. The wagering game system provides a volume control interface operable to allow a user of the wagering game system to control the volume of the one or more speakers comprising a part of the external sign assembly via the sign server.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

One example embodiment of the invention comprises a computerized wagering game system including a gaming module comprising gaming code which is operable when executed on to conduct a wagering game on which monetary value can be wagered. The wagering game system is coupled to at least one external sign assembly via a sign server, the external sign comprising one or more speakers. The wagering game system provides a volume control interface operable to allow a user of the wagering game system to control the volume of the one or more speakers comprising a part of the external sign assembly via the sign server, such as through a touchscreen display interface.

Figure 1:
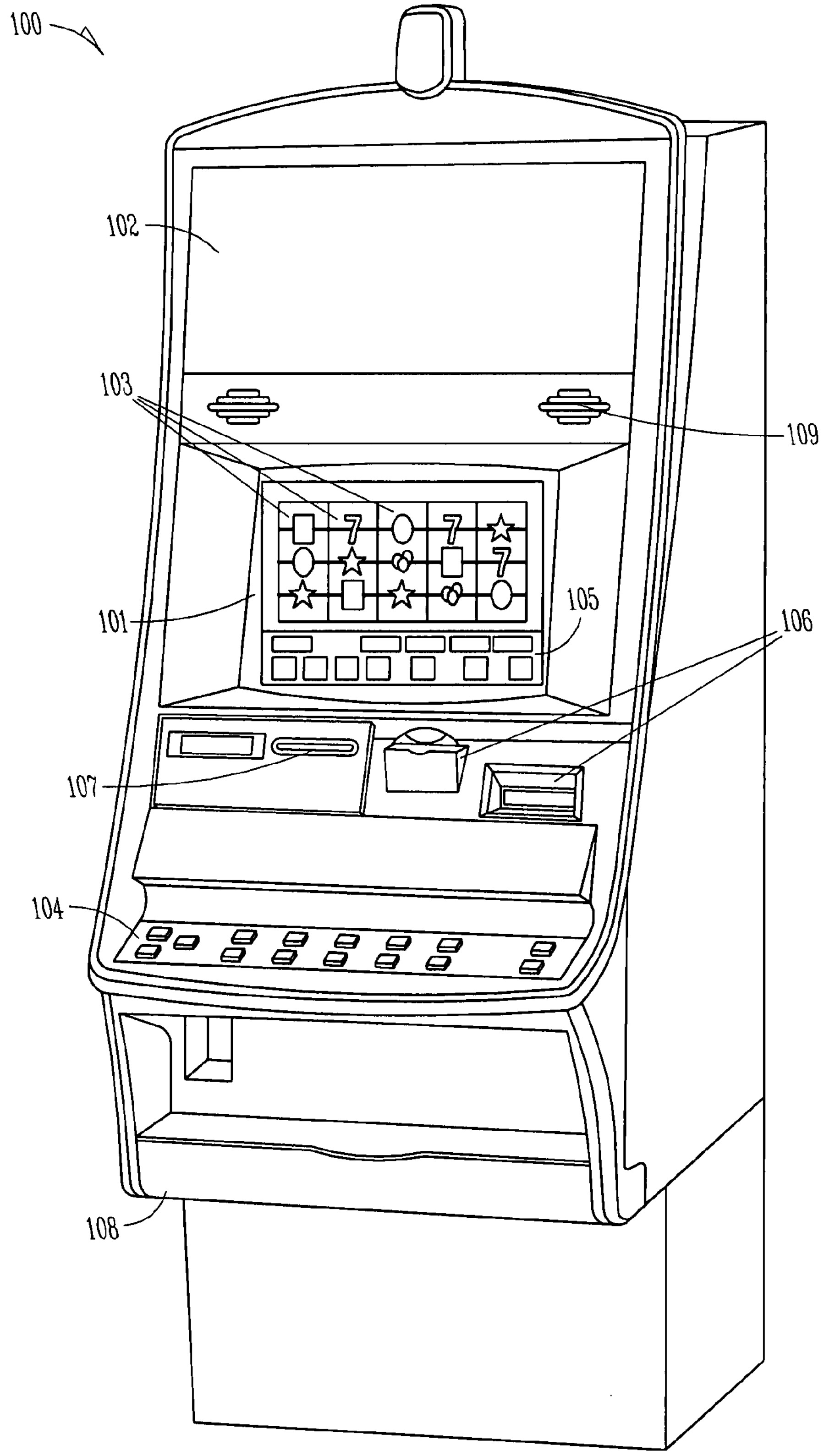
FIG. 1 shows a computerized wagering game machine, as may be used to practice some example embodiments of the invention.

FIG. 1 illustrates a computerized wagering game machine, as may be used to practice some embodiments of the present invention. The computerized gaming system shown generally at 100 is a video wagering game system, which displays information for at least one wagering game upon which monetary value can be wagered on video display 101. Video display 101 is in various embodiments a CRT display, a plasma display, an LCD display, a surface conducting electron emitter display, or any other type of display suitable for displaying electronically provided display information. In some further embodiments, additional displays such as a bonus game display or top box display 102 are further operable to display electronically provided information to a wagering game player. Alternate embodiments of the invention will have other game indicators, such as mechanical reels instead of the video graphics reels shown at 103 that comprise a part of a video slot machine wagering game.

A wagering game is implemented using software within the wagering game, such as through instructions stored on a machine-readable medium such as a hard disk drive or nonvolatile memory. In some further example embodiments, some or all of the software stored in the wagering game machine is encrypted or is verified using a hash algorithm or encryption algorithm to ensure its authenticity and to verify that it has not been altered. For example, in one embodiment the wagering game software is loaded from nonvolatile memory in a compact flash card, and a hash value is calculated or a digital signature is derived to confirm that the data stored on the compact flash card has not been altered. The wagering game implemented via the loaded software takes various forms in different wagering game machines, including such well-known wagering games as reel slots, video poker, blackjack, craps, roulette, or hold 'em games. In some further embodiments, a secondary game or bonus game is displayed on the secondary display 102, or other information such as progressive slot information or other community game information is displayed.

The wagering game is played and controlled with inputs such as various buttons 104 or via a touchscreen overlay to video screen 101. The touchscreen is used in some embodiments to display virtual buttons, which can have unique functions in some embodiments, or can duplicate the functions provided by the mechanical buttons 104 in other embodiments. In some alternate examples, other devices such as virtual buttons 105 on the touchscreen display or a pull arm are employed to provide other input interfaces to the game player, such as to initiate reel spin. The player interface components are in this example contained within or mechanically coupled to the wagering game system, but in other embodiments will be located outside the wagering game system cabinet such as by a wired or wireless electronic connection to the wagering game system.

Monetary value is typically wagered on the outcome of the games, such as with tokens, coins, bills, or cards that hold monetary value. The wagered value is conveyed to the machine such as through a changer 106 or a secure user identification module interface 107, and winnings are returned such as via a returned value ticket, a stored value card, or through the coin tray 108. Sound is also provided through speakers 109, typically including audio indicators of game play, such as reel spins, credit bang-ups, and environmental or other sound effects or music to provide entertainment consistent with a theme of the computerized wagering game. In some further embodiments, the wagering game machine is coupled to a network, and is operable to use its network connection to receive wagering game data, track players and monetary value associated with a player, and to perform other such functions.

In other embodiments, the computerized wagering game system takes one or more other forms, such as a mobile or portable wagering game device, a server-based wagering game device, or a networked wagering game system. These other computerized wagering game system embodiments need not contain all features of the wagering game system of FIG. 1, which does not limit the scope of a computerized wagering game but is provided as an example only.

Figure 2:
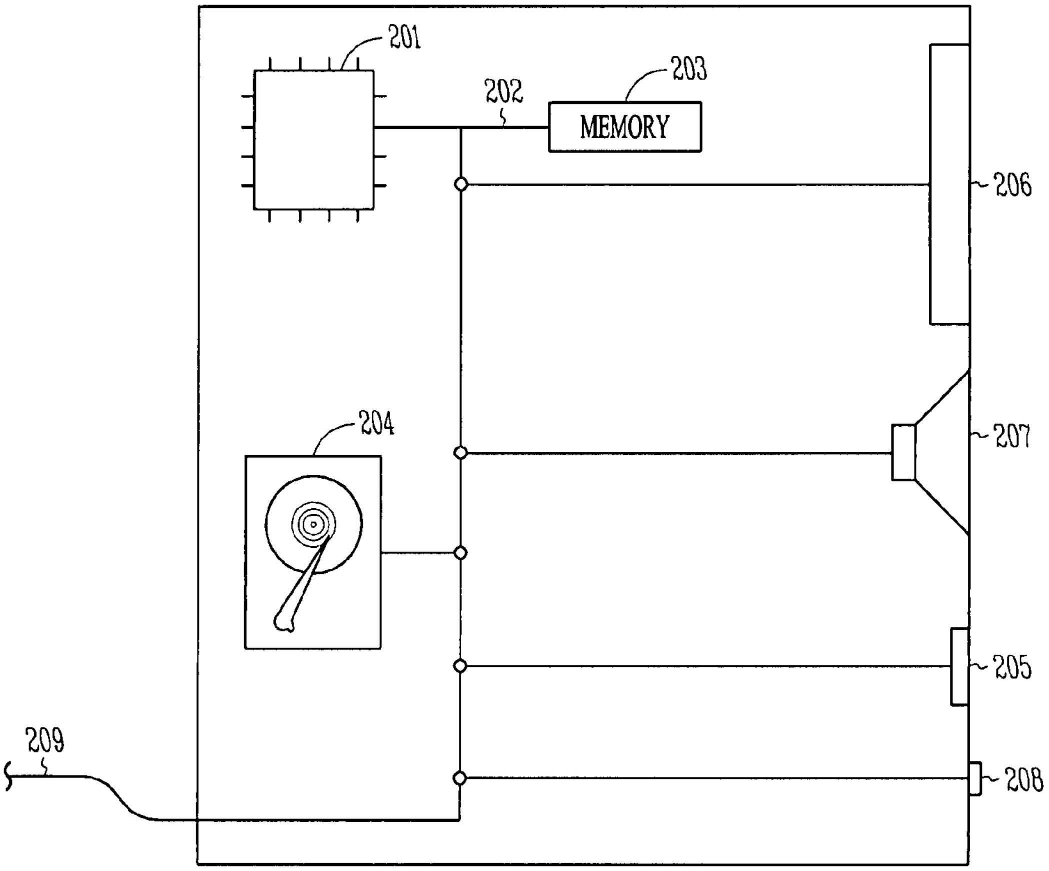
FIG. 2 is a block diagram of a wagering game system, consistent with some example embodiments of the invention.

FIG. 2 shows a block diagram of an example embodiment of a wagering game system. The wagering game system includes a processor 201, which is sometimes called a microprocessor, controller, or central processing unit (CPU). In some embodiments, more than one processor is present, or different types of processors are present in the wagering game system, such as using multiple processors to run gaming code, or using dedicated processors for audio, graphics, security, or other functions. The processor is coupled via a bus 202 to various other components, including memory 203 and nonvolatile storage 204. The nonvolatile storage is able to retain the data stored therein when power is removed, and in various embodiments takes the form of a hard disk drive, nonvolatile random access memory such as a compact flash card, or network-coupled storage. Further embodiments include additional data storage technologies, such as compact disc, DVD, or HD-DVD storage in the wagering game system.

The bus 202 also couples the processor and components to various other components, such as a value acceptor 205, which is in some embodiments a token acceptor, a card reader, or a biometric or wireless player identification reader. A touchscreen display 206 and speakers 207 serve to provide an interface between the wagering game system and a wagering game player, as do various other components such as buttons 208, pullarms, and joysticks. A network connection 209 couples the wagering game system to other wagering game machines and to a wagering game server, such as to provide downloadable games or to provide accounting, player tracking, or other functions. These components are located in a wagering game machine cabinet such as that of FIG. 1 in some embodiments, but can be located in multiple enclosures comprising a wagering game system or outside a wagering game machine cabinet in other embodiments, or in alternate forms such as a wireless or mobile device.

In operation, the wagering game system loads program code from nonvolatile storage 204 into memory 203, and the processor 201 executes the program code to cause the wagering game system to perform desired functions such as to present a wagering game upon which monetary value can be wagered. This and other functions are provided by various modules in the computerized system such as an audio module, a game presentation module, or a touchscreen display module, where such modules comprise in some embodiments hardware, software, mechanical elements, manual intervention, and various combinations thereof. The wagering game system is coupled to other wagering game systems, and to various other elements such as game servers, accounting servers, or community or progressive game servers via the network connection 209, and exchanges data with these servers via the network connection.

Figure 3:
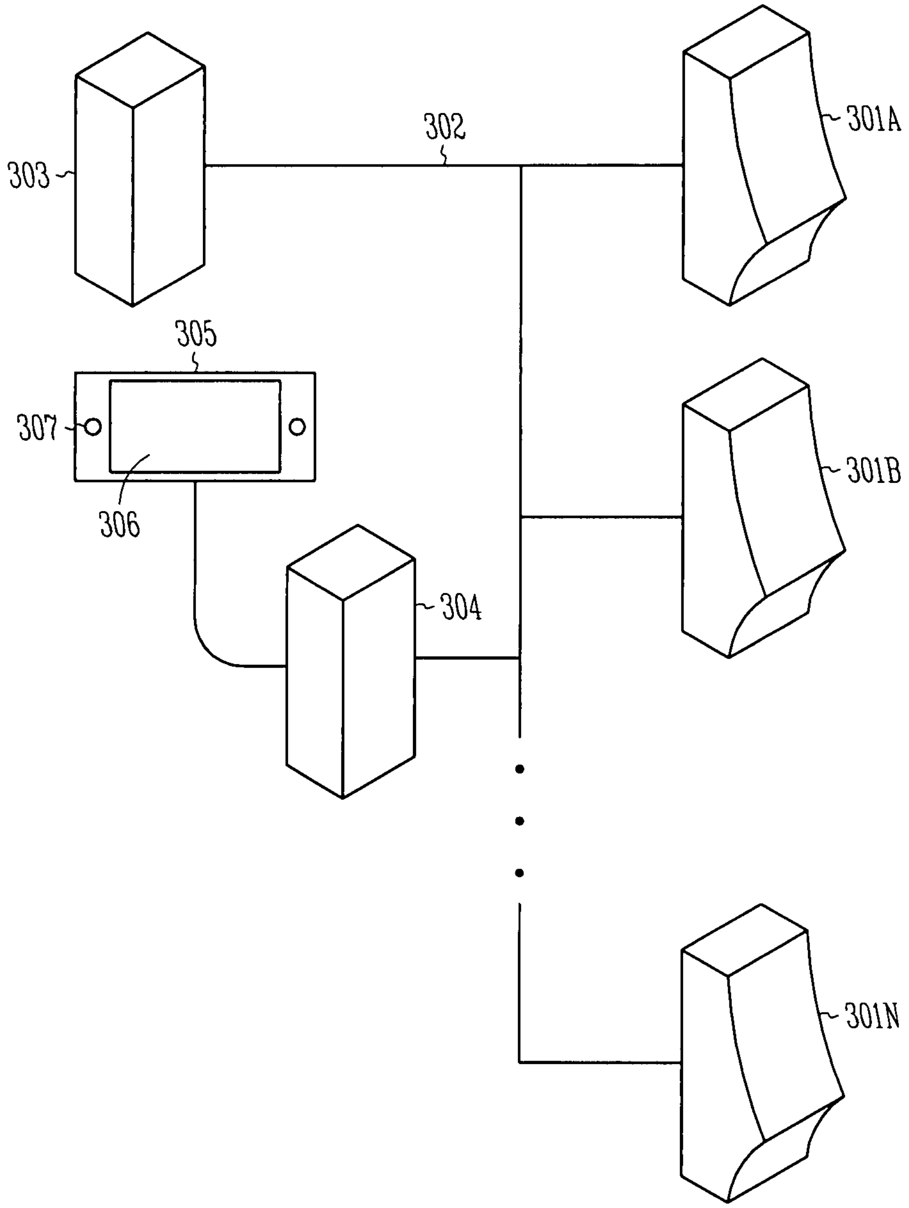
FIG. 3 is a block diagram of wagering game systems coupled to an external sign assembly via a sign server, consistent with some example embodiments of the invention.

In one such example shown in FIG. 3, a number of wagering game systems 301A-n are coupled via a network 302, such as an Ethernet or wireless network. The games are coupled to a wagering game server 303, used for such functions as accounting and downloading new game content to the wagering game systems. The wagering game systems are also coupled to a sign server 304, which is in turn coupled to an external sign 305. In this example, the sign includes both a display area 306 such as a plasma, OLED, or SED display, and one or more speakers 307. The sign server 304 is coupled to the sign assembly such as by a USB, wireless network, or other connection so that it can send audio and video data to the sign for presentation to the users of wagering game systems 301A-n.

The wagering game systems 301 are part of a community game or a progressive game in some examples, and the sign server 304 further functions as a progressive or community game server. In one such progressive game example, a jackpot amount available to any of the wagering game systems 301 is coordinated via the progressive game server, and is available to be won via any of the wagering game systems 301A-n. The progressive jackpot typically starts at a minimum jackpot value, and increases by a small amount for each game played on any of the wagering game systems that are a part of the progressive slot group. The current jackpot value is displayed via a sign such as sign 305, and updates or changes with each game played. Once a game player wins the jackpot, such as by placing the maximum bet and winning the progressive jackpot during game play on one of the wagering game systems 301, the jackpot is awarded and falls back to the minimum set jackpot value.

In another example, a community game such as a bonus game in which each eligible game player participates is managed by the server 304 and presented via the sign assembly 305. The community bonus game in one example is randomly triggered, and includes all players who have met a minimum level of play on an associated wagering game system 301. In some further embodiments, the bonus game winnings are based on a multiplier or weight based on the amount or speed of game play for each of the individual game players. The players win bonus value based on either individual events, such as individual progression around a game board, or on common events such as a prize or event card drawn and awarded to all bonus participants. In these community games, game elements such as a game board, a common prize, or individual participant status are shown on the sign 305.

The sign 305 desirably displays information via a display element 306, but in this embodiment also includes sound via speakers 307. The sound and video are provided via the sign server 304, and include information such as the state of the bonus round, indication of prizes or awards won, and other information relating to qualification or play of the community bonus game. The display and speaker components of the sign are used in various other embodiments for other functions, such as to attract game players, or to provide instruction relating to game play. The sign assembly is desirably configured such that the game players can all see and hear the sign, and in some embodiments includes multiple display elements, speakers, or sign assemblies to provide better coverage of the gaming area.

The sound presented via the speakers 307 is controlled or regulated in a typical prior art system by a volume control knob coupled to a potentiometer that is a part of the sign assembly 305. Turning the knob changes the impedance of the potentiometer, resulting in a change in the volume of the sound produced by speakers 307. The sound control in many such cases is intentionally placed in a difficult location to reach, so that players are not easily able to adjust the sign volume on their own without use of a ladder or chair and knowledge of the volume knob's location. This method is simple and reliable, but considering that multiple signs may be used and may be placed in difficult positions to access in many progressive or community game installations, there is a need for another volume control solution. One embodiment of the invention provides such a volume control solution by enabling a wagering game system installer or technician to access a control menu via one of the attached wagering game systems 301 to change the volume setting for the sign assembly via the sign server 304.

Figure 4:
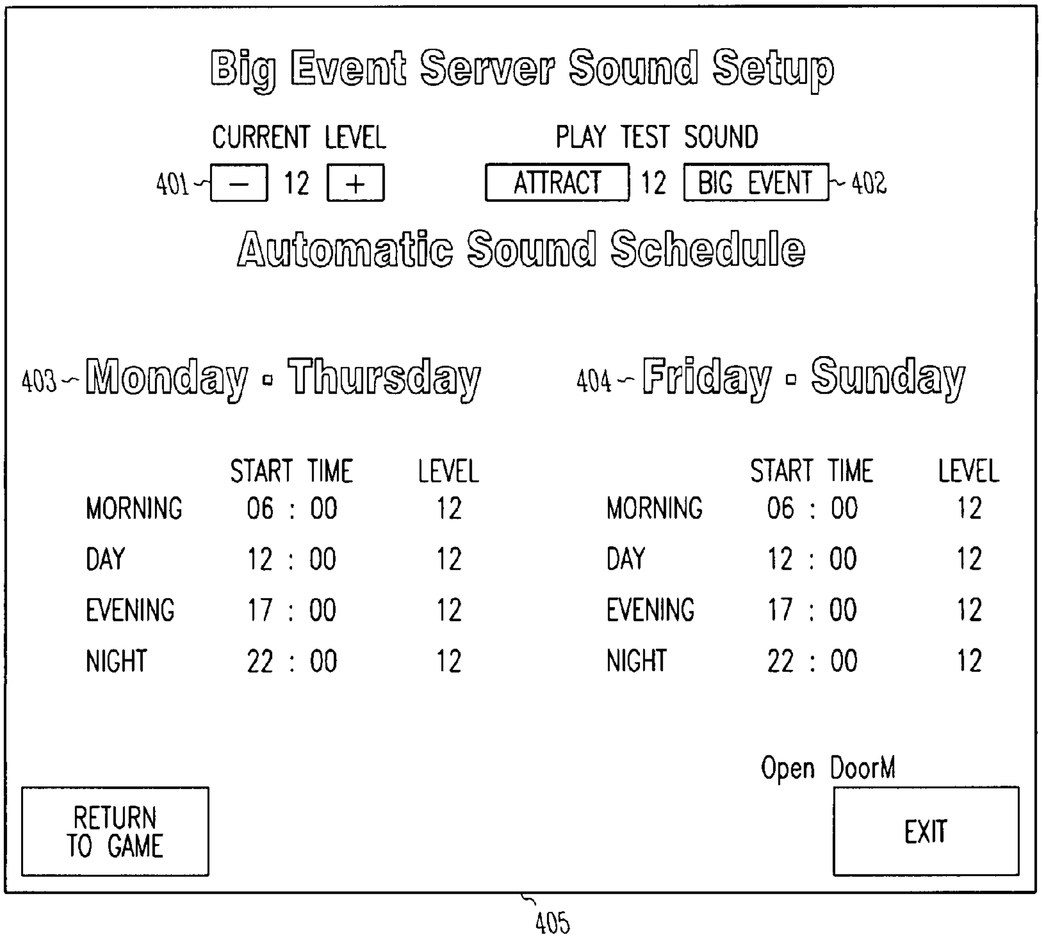
FIG. 4 is a screen image of a touchscreen volume control interface, consistent with some example embodiments of the invention.

FIG. 4 is a screen shot of a touchscreen control for adjusting the external sign assembly volume settings stored in the sign server, consistent with an example embodiment of the invention. The current volume setting is shown at 401, along with plus and minus touchscreen controls to change the volume setting. Test sounds can be played via the "Play Test Sound" buttons for attract mode sounds and big event sounds shown at 402, both to gauge the suitability of the initial volume setting and to test new volume settings as the volume is changed via control 401. Although this example illustrates a distinction between attract mode sounds and sounds used in a "big event" element of a wagering game, other examples will allow a game technician to independently test volume settings for a variety of other game elements, and to select independent volume settings for a variety of game elements.

In a further embodiment, the sound volume settings can be adjusted by time, such as by time of day or day of the week. Here, there are two separate time of day groupings, one for Monday through Thursday at 403, and one for Friday through Sunday at 404. For each of the days of the week categories, there are four separate time of day settings, including morning, day, evening, and night. In this example, the technician has the ability to set when each of these periods starts, enabling further customization of volume control of the external sign assembly.

Time of day settings enable a wagering game facility to tailor its volume settings to anticipated noise or traffic levels in a wagering game establishment without having to manually adjust the volume of the speaker system as the noise or traffic level changes. Many wagering game establishments are nearly always busier at night and on weekends than during the week or during morning hours, so it can be anticipated that the volume level should be higher during weekends and during evenings than during a weekday morning. The time of day and day of week options presented in FIG. 4 therefore enable a wagering game technician to select and test volume levels for a variety of potential traffic and noise conditions, and further allow the technician to select a customized volume and set a custom start time for each of four different time periods during the course of a day. In one such example, the game technician may recognize that most variation in noise and traffic occurs late in the day, and will set the morning period to extend from 7 o'clock AM until 5 o'clock PM, will set the day period to extend from 5 o'clock PM to 9 o'clock PM, will set the evening period to extend from 9 o'clock PM to 2 o'clock AM, and will use the night settings for times between 2 o'clock PM and 7 o'clock AM. While such a use removes the ability to have separate settings for actual morning and daytime hours, it enables further refinement in handling the busier and more varied evening and night hours.

For each identified time of day category, a separate volume setting can be selected as reflected in the column marked "Level", by touching the volume setting to be changed to select the appropriate volume setting before adjusting it via volume control 401. Once the volume settings are all made, the technician touches the "Save" button at 405, and leaves the volume menu such as by going back to a master service or configuration menu. The saved settings in this embodiment are not simply stored in the wagering game system, but are communicated via the network connection 302 to the sign server 304, which controls the volume of speakers 307 using the settings received from the wagering game system.

In further embodiments, the sound settings are not simply based on time of day or absolute volume settings, but are adjusted based on perceived sound level or perceived traffic level in the gaming facility. For example, a microphone incorporated into the sign assembly would be able to measure the ambient noise level around the sign, and adjust the volume up or down from its volume setting depending on the perceived noise. Similarly, the sign controller coupled to the wagering game machines 301 via the network 302 in some embodiments is able to track the number of wagering game systems that are actively being played in a certain area, thereby estimating the gaming traffic level in the vicinity of the sign assembly. Volume of the sign can then be adjusted up from its normal volume setting if traffic is particularly heavy, or made quieter if the traffic is particularly light. In another embodiment, the volume of the sign speakers is set based on volume settings either polled or sent to wagering games in the area of the sign, such that the sign speakers can be played louder when the wagering game system speakers are at higher volumes.

Volume in another example is not adjustable over the full range of volumes that a particular speaker or amplifier is capable of playing, but is limited to a certain desired range of volumes. For example, the manufacturer may determine that the volume should never be set below a level of five on a zero-to-twelve scale, so may restrict the user of a touchscreen control such as that of FIG. 4 from entering volume settings outside the desired range. In an alternate embodiment, the full range of volumes 0-12 are displayed, but the number zero corresponds to a minimum volume level that is audible and that is selected as a desired minimum volume level rather than to no volume. In some embodiments the minimum volume level is selected by the manufacturer, while in other embodiments the wagering game facility manager can configure the minimum volume level.

The speakers 307 are in some further embodiments not incorporated into the same physical unit as the display element 306, but may be positioned elsewhere, such as on a pole used to mount the display portion of the sign assembly or may be distributed around the progressive or community game area. In one such embodiment, a number of speakers are placed throughout the community or progressive game area, oriented in different directions to ensure relatively even sound coverage for all game players. In another embodiment, the volume setting for the speakers is sent via the sign server 304 to a speaker assembly, such as a speaker and a digital amplifier having a digital volume setting, that receives the volume setting from the wagering game system and adjusts the volume of the speaker accordingly. This enables the speaker portion of the sign assembly to be connected via standard computer connections such as a USB connection rather than relying on the server 304 to provide an audio signal and an external amplifier to amplify the sound.

These and other configurations allow a wagering game system user such as a technician to operate a volume control interface such as a touchscreen display to adjust volume settings for a speaker or speaker system external to the wagering game system, such as a speaker system comprising a part of a sign assembly for a progressive or community wagering game. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A computerized wagering game system, comprising:

a gaming module comprising gaming code which is operable to present a wagering game on which monetary value can be wagered;

at least one external sign assembly coupled to the wagering game system and at least one other wagering game system via a sign server, the external sign assembly comprising one or more speakers and a display, wherein the one or more speakers are configured to play sounds correlated to the display of the external sign assembly, and wherein the display of the external sign assembly is used to display information to users of the wagering game system and at least one other wagering game system; and a volume control interface, operable to allow a user of the wagering game system to control the volume of the one or more speakers via the sign server.

2. The computerized wagering game system of claim 1, wherein the volume of the one or more speakers is controlled via a volume control setting stored in the sign server.

3. The computerized wagering game system of claim 1, wherein the external sign assembly is operable to present information relating to at least one of a community game or a progressive game.

4. The computerized wagering game system of claim 3, wherein the sign server comprises at least one of a progressive game server or a community game server.

5. The computerized wagering game system of claim 1, wherein the one or more speakers are operable to play sounds generated in the sign server.

6. The computerized wagering game system of claim 1, wherein the volume control interface comprises a touchscreen interface.

7. The computerized wagering game system of claim 1, wherein the volume control interface allows a user to control volume of the one or more speakers by sending a volume setting to the sign server.

8. The computerized wagering game system of claim 1, wherein the volume of the one or more speakers varies by at least one of time of day, day, week, month, holiday, occupancy level, or perceived noise level.

9. The computerized wagering game system of claim 1, further comprising a gaming terminal operable to present the volume control interface.

10. A method of managing a wagering game system, comprising:

presenting a volume control interface on a wagering game system operable to present a wagering game on which monetary value can be wagered, the volume control interface operable to allow a user of the wagering game system to control a volume of one or more speakers comprising a part of an external sign assembly via a sign server, wherein the one or more speakers play sounds correlating to a display of the external sign assembly, and wherein the display of the external sign assembly is used to display information to users of the wagering game system and at least one other wagering game system.

11. The method of managing a wagering game system of claim 10, further comprising sending a specified volume setting from the wagering game system to the sign server.

12. The method of managing a wagering game system of claim 11, further comprising adjusting the volume of the one or more speakers based on the volume setting sent to the sign server.

13. The method of managing a wagering game system of claim 10, further comprising presenting information relating to at least one of a community game or a progressive game via the external sign assembly.

14. The method of managing a wagering game system of claim 10, wherein the volume control interface comprises a touchscreen interface.

15. The method of managing a wagering game system of claim 10, wherein the volume of the one or more speakers varies by at least one of time of day, day, week, month, holiday, occupancy level, or perceived noise level.

16. The method of managing a wagering game system of claim 10, wherein the volume of the one or more speakers varies based on at least one of perceived noise proximate to the wagering game system, perceived traffic proximate to the wagering game system, volume of wagering game systems in the area, and number of active wagering games in the area.

17. The method of managing a wagering game system of claim 10, wherein presenting a volume control interface on a wagering game system comprises presenting the volume control interface on a wagering game terminal.

18. A machine-readable storage medium with instructions stored thereon, the instructions operable when executed to:

present a volume control interface on a wagering game system operable to present a wagering game on which monetary value can be wagered, the volume control interface operable to allow a user of the wagering game system to control a volume of one or more speakers comprising a part of an external sign assembly via a sign server, wherein the one or more speakers play sounds correlating to a display of the external sign assembly, and wherein the display of the external sign assembly is used to display information to users of the wagering game system and at least one other wagering game system.

19. The machine-readable storage medium of claim 18, the instructions when executed further operable to send a specified volume setting from the wagering game system to the sign server.

20. The machine-readable storage medium of claim 18, wherein the volume control interface comprises a touchscreen interface.

21. The machine-readable storage medium of claim 18, wherein the volume of the one or more speakers varies by at least one of time of day, day, week, month, holiday, occupancy level, or perceived noise level.

22. A method of operating a wagering game sign server, comprising:

receiving a volume setting from a wagering game system that is operable to present a wagering game on which monetary value can be wagered; and setting the volume of one or more speakers comprising a part of an external sign assembly according to the received volume setting, wherein the one or more speakers play sounds correlating to a display of the external sign assembly, and wherein the display of the external sign assembly is used to display information to users of the wagering game system and at least one other wagering game system.

23. The method of operating a wagering game sign server of claim 22, wherein the volume of the one or more speakers varies by at least one of time of day, day, week, month, holiday, occupancy level, or perceived noise level.

24. The computerized wagering game system of claim 1, wherein the volume of the one or more speakers is adjusted based on an estimated gaming traffic level in a vicinity of the external sign assembly, the estimated gaming traffic level determined from gaming activity occurring at the wagering game system and the at least one other wagering game system.

* * * * *